US009732949B2

(12) United States Patent
Grant et al.

(10) Patent No.: US 9,732,949 B2
(45) Date of Patent: Aug. 15, 2017

(54) INDUSTRIAL LIGHTING SUPPORT SYSTEM

(71) Applicants: Andrew James Grant, Houston, TX (US); Allen Coogler, Houston, TX (US); Michael Walton, Houston, TX (US); Jeremy Kyne, Houston, TX (US)

(72) Inventors: Andrew James Grant, Houston, TX (US); Allen Coogler, Houston, TX (US); Michael Walton, Houston, TX (US); Jeremy Kyne, Houston, TX (US)

(73) Assignee: EATON ENTERPRISES (HUNGARY) KFT., Budapest (HU)

( * ) Notice: Subject to any disclaimer, the term of this patent is extended or adjusted under 35 U.S.C. 154(b) by 179 days.

(21) Appl. No.: 14/175,666

(22) Filed: Feb. 7, 2014

(65) Prior Publication Data

US 2015/0144372 A1 May 28, 2015

Related U.S. Application Data

(60) Provisional application No. 61/908,540, filed on Nov. 25, 2013.

(51) Int. Cl.

*H01B 7/00* (2006.01)
*F21V 21/22* (2006.01)
(Continued)

(52) U.S. Cl.

CPC ............... *F21V 21/22* (2013.01); *F21S 8/088* (2013.01); *F21V 23/002* (2013.01); *F21W 2131/10* (2013.01)

(58) Field of Classification Search

CPC ........ F21V 23/02; F21V 21/22; F21V 23/002; F21S 6/002; F21S 6/006; F21S 8/088; F31W 2131/10
(Continued)

(56) References Cited

U.S. PATENT DOCUMENTS

| | | | | |
|---|---|---|---|---|
| 1,309,375 A * | 7/1919 | Taylor | ...................... | A47C 3/28 248/413 |
| 2,063,263 A * | 12/1936 | Murphy | .................. | E01F 9/627 404/11 |

(Continued)

FOREIGN PATENT DOCUMENTS

| | | | | |
|---|---|---|---|---|
| GB | 406081 A | 2/1934 | | |
| GB | 2296558 A * | 7/1996 | ............. | F21S 6/005 |
| GB | 2490658 B | 11/2012 | | |

*Primary Examiner* — Pete Lee
(74) *Attorney, Agent, or Firm* — Pearne & Gordon LLP

(57) ABSTRACT

A pole support system suitable for lighting fixtures. The system may include a lower support; a guide member interior to the lower support; a telescoping upper support inside the lower support and axially movable between an extended position and a retracted position, the upper support being at least partially received in an annular space between the lower support and the guide member; a biasing member biasing the upper support to the extended position; and a locking assembly partially surrounding the lower support at one end of the lower support. The locking assembly may include a body having a passage in which the upper support slides therethrough, and enclosing the passage at a first end while maintaining the passage in fluid communication with the interior of the lower support; and a lock configured to selectably engage the upper support to constrain axial motion of the upper support.

18 Claims, 13 Drawing Sheets

(51) Int. Cl.
*F21S 8/08* (2006.01)
*F21V 23/00* (2015.01)
*F21W 131/10* (2006.01)

(58) Field of Classification Search
USPC ................................ 174/45 R; 362/413, 411
See application file for complete search history.

(56) References Cited

U.S. PATENT DOCUMENTS 2,490,125 A 12/1949 Greppin
2,642,246 A * 6/1953 Larry ...................... F21V 21/22 248/188.5
2,849,204 A * 8/1958 Petrick .................... F21V 21/22 248/410
2,896,972 A * 7/1959 Zavertnik ............... F21V 21/02 174/61
3,034,098 A 5/1962 Clasen
3,055,972 A * 9/1962 Peterson .............. H02G 3/0658 174/151
3,410,995 A * 11/1968 Gray ..................... F21V 21/108 248/121
3,736,417 A * 5/1973 Williams .................. F21S 8/06 248/317
4,152,757 A 5/1979 Bilson et al.
4,390,933 A 6/1983 Warshawsky
4,527,225 A 7/1985 Hartman
4,874,991 A * 10/1989 Ruskin .................... F21S 6/006 315/362
5,003,442 A 3/1991 Gallo et al.
5,425,526 A * 6/1995 Shen ..................... F16B 7/1472 248/562
7,234,847 B2 6/2007 Yoshimori et al.
8,602,613 B2 12/2013 Pike et al.
2003/0137847 A1 7/2003 Cooper
2006/0146550 A1 7/2006 Simpson et al.
2006/0279948 A1 12/2006 Tsai

* cited by examiner

INDUSTRIAL LIGHTING SUPPORT SYSTEM

CROSS-REFERENCE TO RELATED APPLICATIONS

This applications claims priority from U.S. Provisional Application Ser. No. 61/908,540, filed Nov. 25, 2013, the disclosure of which is incorporated herein by reference in its entirety.

FIELD

The present disclosure relates generally to a telescoping light pole with an internal passage for electrical wiring and configured for a telescoping function facilitating worker access to a remote fixture.

BACKGROUND

Lighting systems are used in many applications, with different constructions provided for different environments. Lighting is particularly important in industrial applications, which often require work in low light conditions (e.g., at night). However, due to environmental conditions, accessing pole-mounted lights can be difficult and often dangerous. Adjustable lighting systems have been developed for industrial applications. As a result of the perils of ladder use in industrial settings, systems have been developed to safely lower the remote end (top end) of a light pole.

SUMMARY

Aspects of the present disclosure relate to systems, methods, and devices for lighting fixture pole support. General embodiments may include a pole support system including a tubular lower support; a guide member interior to the lower support, the guide member extending substantially along a length of the lower support; a telescoping upper support inside the lower support and axially movable between an extended position and a retracted position, the upper support being at least partially received in an annular space between the lower support and the guide member; a biasing member biasing the upper support to the extended position; and a locking assembly partially surrounding the lower support at one end of the lower support. The locking assembly may include a body having a passage in which the upper support slides therethrough, the body attached to the lower support to enclose the passage at a first end while maintaining the passage in fluid communication with the interior of the lower support; and a lock configured to selectably engage the upper support to constrain axial motion of the upper support.

The biasing member may include a spring in the annular space between the lower support and the housing. The body may be attached to the lower support by at least one selectably sealingly engageable fastener. The guide member may include fluid-tight tubular. The system may include a base configured for coupling with the fluid-tight tubular and the lower support at corresponding ends opposite the locking assembly and configured to isolate an interior of the fluid-tight electrical conduit from the annular space between the lower support and the housing. The base may include a channel between the first end of the base and a second end of the base in fluid-tight communication with the fluid-tight tubular. The lock comprises a translational member configured to translate into the passage against the upper support. The locking assembly may include a raised surface in the passage opposite the translational member. The raised surface may be a ledge. The system may include electrical wiring, wherein a portion of the electrical wiring within the upper support is configured to conform to a length of a portion of the upper support above the locking mechanism. The system may include a wiring seal. The guide member may be coaxial with a longitudinal axis of the lower support.

Other general embodiments may include a pole support system including a tubular lower support; a fluid-tight wiring chamber interior to the lower support, the wiring chamber extending substantially along a length of the lower support; a telescoping upper support inside the lower support and axially movable between an extended position and a retracted position, the upper support being at least partially received in an annular space between the lower support and the wiring chamber; a biasing member biasing the upper support to the extended position; and a locking assembly partially surrounding the lower support at one end of the lower support. The locking assembly may include a body having a passage in which the upper support slides therethrough, the body attached to the lower support to enclose the passage at a first end while maintaining the passage in fluid communication with the interior of the lower support; and a lock configured to selectably engage the upper support to constrain axial motion of the upper support.

Other general embodiments may include a locking assembly for use in a pole support system, as described herein. For example, the locking assembly may include a body having a passage configured for sliding transmission of an upper support therethrough, the body configured for selectable sealing engagement to a tubular lower support to enclose the passage at a first end while maintaining the passage in fluid communication with the interior of the lower support; and a lock configured to selectably engage the upper support to constrain axial motion of the upper support.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

BRIEF DESCRIPTION OF THE DRAWINGS

The following figures are part of the present specification, included to demonstrate certain aspects of embodiments of the present disclosure and referenced in the detailed description herein. Unless otherwise noted, figures are not drawn to scale.

DETAILED DESCRIPTION

Figure 1:
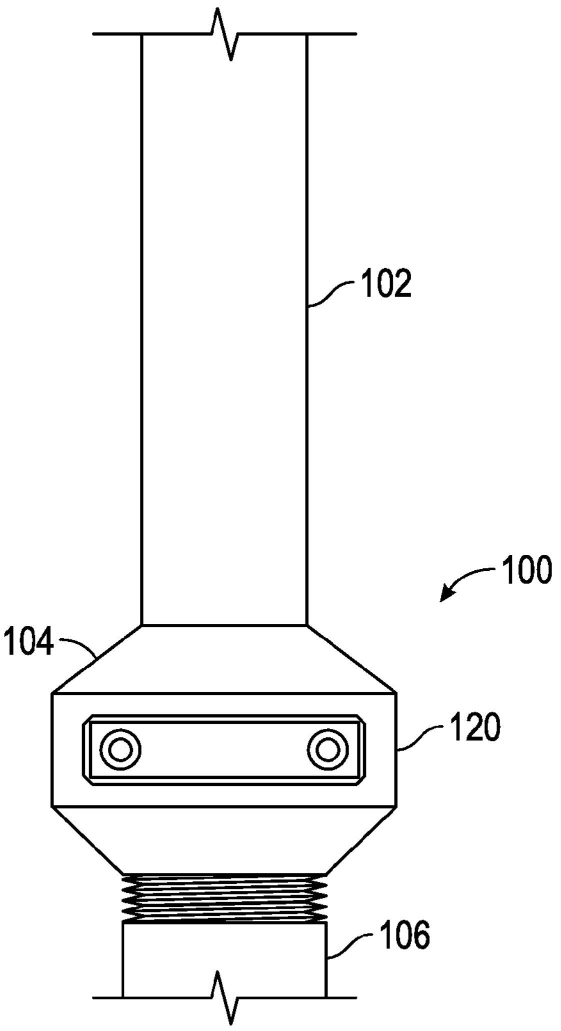
FIGS. 1-3 illustrate a pole support system for industrial lighting in accordance with embodiments of the present disclosure.

Exposed wiring for lighting systems is susceptible to environmental hazards, such as moisture. Some known systems have a passage interior to the pole running to the remote end, and wiring (wires, cables, etc.) running through the passage to the light fixture. Known systems are inefficient in protecting the installed wiring. Normal movement of the components often damages internal wiring (e.g., "pinching").

Further, traditional industrial fixtures (particularly those with ballast hinges) are configured for use on a pole with a particular operational axis (e.g., the axis while in use). Because most industrial fixtures are not designed for use with a lowerable pole, changing the operational axis introduces instability in the fixture. One reason for the instability is the introduction when lowering the fixture of additional forces that are not present during normal operation. Forces having a component normal to the operational axis may be particularly problematic. Thus, traditional lowered poles using joints or the like for lowering may result in instability of the fixture, particularly while the pole is deviated from its operational axis. This instability may result in fixtures detaching prematurely, and possibly falling from height, which is a safety hazard.

It would be desirable to increase protection for wiring in light poles in industrial settings while still facilitating repair or maintenance of light fixtures atop the light pole by bringing the fixture to ground level. It would also be desirable to enable a single worker to perform the action of raising and/or lowering the fixture, thereby reducing the costs of labor relating to maintenance, while maintaining the pole in its operational axis.

Generally, embodiments of the present disclosure may relate to spring assisted telescoping industrial light poles. As part of the telescoping nature of the present disclosure, the upper support (or upper pole) is slidably engaged with the lower support (or lower pole). The telescoping supports, along with the spring assist, allow the top mounted light fixture to be moved up and down. Thus the light fixture can be raised or lowered to the position of a user in the identical operational axis. Thus safety is increased, as there is less risk of accident when moving the light fixture in relation to a user. Aspects of the present disclosure also relate to safeguards for the wiring providing power to the fixture. Further aspects relate to general robustness and longevity of the pole support system in environmental conditions likely to be experienced upon installation in an outdoor or marine industrial setting (e.g., mines, offshore oil rigs). For example, depending on the particular materials used, a 10-foot pole support system of the present design may be rated for winds of over 300 miles per hour.

The principles of the disclosure are explained by describing in detail, specific example embodiments of devices, systems, and methods for facilitating access to industrial lighting. Aspects of the present disclosure resist deleterious conditions, such as, for example, rain, high winds, impact, conditions associated with industrial environments, and so on.

General embodiments of the disclosure include pole support systems and devices for incorporation within a pole support system. The pole support system may be configured for use with traditional light fixtures and enable height adjustment of a fixture via a telescoping upper pole. More specific example embodiments are described below. Embodiments relate to wired support systems (e.g., 'wired poles'). A wired pole may include wiring or cabling operatively coupled with the lighting or other mounted item. Some aspects of the present disclosure may allow toggling between optimal orientations for maintenance and operation more easily, safely and/or rapidly.

Example embodiments were chosen and described in order to best explain the principles of the disclosure and their practical application, and to enable others of ordinary skill in the art to understand the disclosure for various embodiments with various modifications as are suited to the particular use contemplated. Those skilled in the art will understand, however, that the invention may be embodied as many other devices, systems, and methods. For example, various aspects of the methods and devices may be combined in various ways or with various products, including existing products. Many modifications and variations will be apparent to those of ordinary skill in the art. The scope of the invention is not intended to be limited by the details of example embodiments described herein. The scope of the disclosure should be determined through study of the appended claims.

Specific design details have been provided for illustration, but should not be considered limiting. Readers of skill in the art will recognize that many variations of telescoping pole support systems may be implemented consistent with the scope of the disclosure as described by the appended claims.

Figure 2:
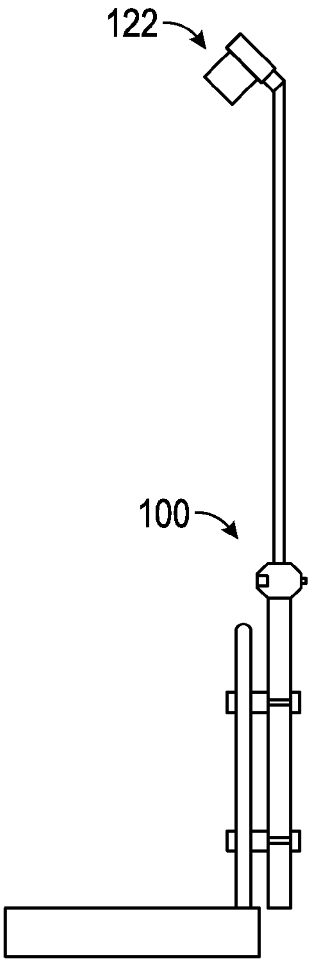
Figure 3:
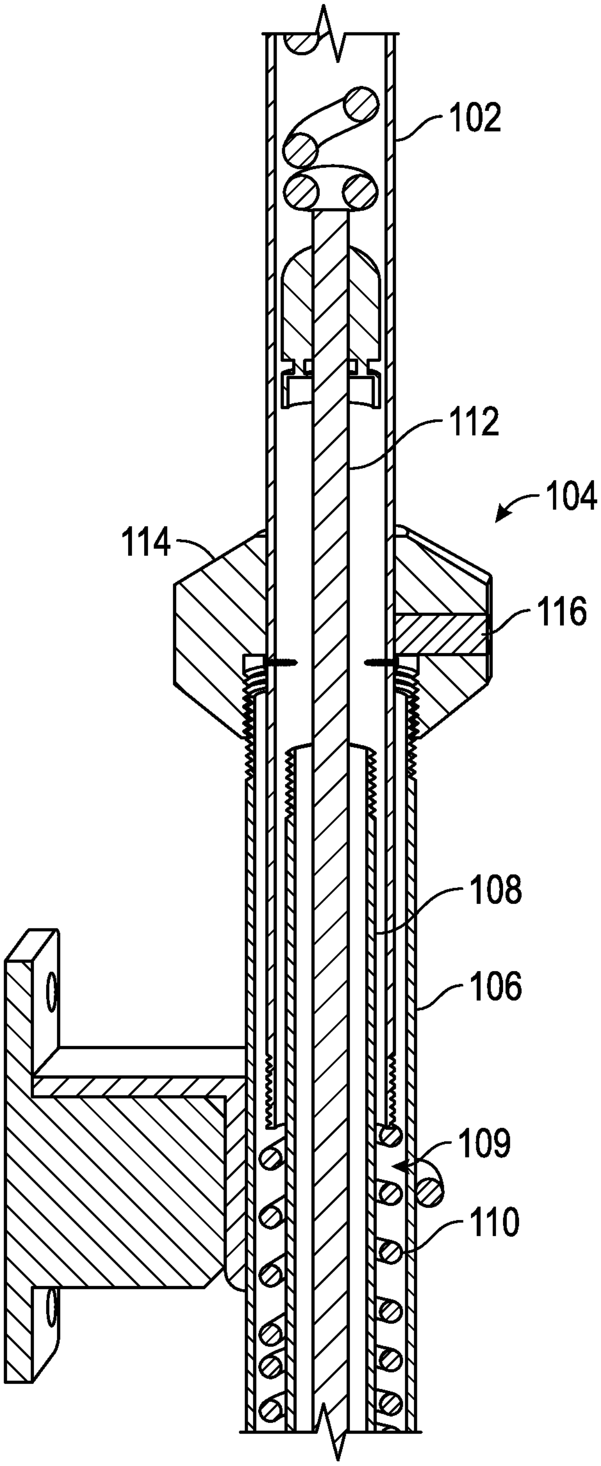

FIGS. 1-3 illustrate a pole support system for industrial lighting in accordance with embodiments of the present disclosure. Referring to FIGS. 1 and 2, the pole support system 100 comprises a lower support 106, a telescoping upper support 102, and a locking assembly 104 attached to the locking assembly 104. The lower support 106 may be tubular. Tubular as used herein may include tubular with cylindrical, rectangular, elliptical, or irregular cross-sections. The pole support system supports at least one light fixture 122. Light fixture 122 may be a traditional light fixture. Upper support 102 and lower support 106 may be implemented as 2-inch tubular comprising aluminum, galvanized or stainless steel, or the like, or any other material as would occur to one of skill in the art.

FIG. 3 shows a cross section of pole support system 100. Referring to FIG. 3, pole support system 100 further includes a guide member 108 interior to the lower support 106. The guide member 108 may extend substantially along the length of the lower support 106. "Substantially along the length of the lower support 106," as described herein, may be defined as a range spanning (at either end) from 18 inches longer to 6 inches shorter than the lower support. Other embodiments may include guide member 108 extending greater than 18 inches farther than the lower support 106.

Upper support 102 lies inside the lower support 106 and is axially movable between an extended position and a retracted position. Locking assembly 104 at least partially surrounds the lower support 106 at one end of the lower support 106. The upper support 102 may be at least partially received in an annular space 109 between the lower support 106 and the guide member 108. The guide member 108 may be concentric with the lower support 106 and/or upper support 102. A biasing member 110 in the annular space 109 biases the upper support 102 to the extended position. The biasing member 110 may be implemented as a spring (as shown), an elastomeric member, a pneumatic or hydraulic system, and so on.

In operation, an attached light fixture 122 is accessible by adjusting the pole support system height via the upper support 102 retracting into the lower support 106. The telescoping connection between the upper support 102 and the lower support 106 is aided by the "spring assist" from the biasing member 110. The spring assist reduces the amount of strength needed to raise or lower the upper support to a desired height. The light fixture 122 is secured at a desired height by the lock assembly 104.

Locking assembly 104 includes a chamfer away from the upper support on the upper surface to resist standing water while maintaining structural strength. Other embodiments may include an arched upper surface, a level upper surface, or other designs. The lower surface may be the same or different than the upper surface. It is to be understood that varying designs may have associated advantages and disadvantages that recommend their use, and that all such variations are within the scope of the present disclosure.

Figure 4A:
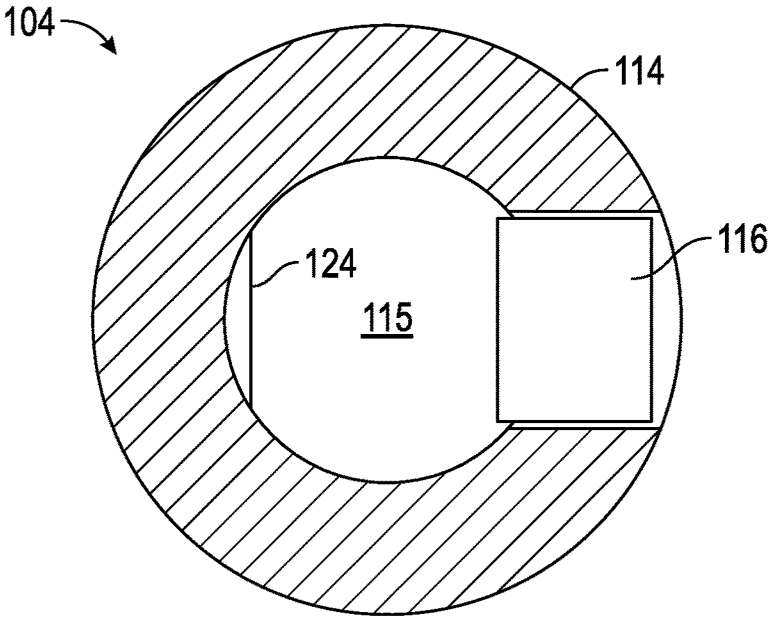
FIGS. 4A & 4B illustrate locking assemblies in accordance with embodiments of the present disclosure.
Figure 4B:
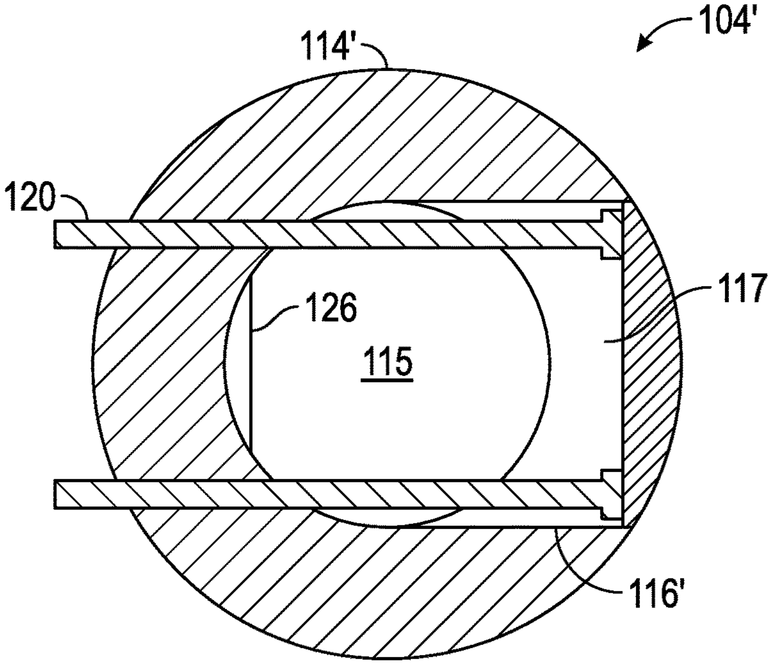
Figure 5A:
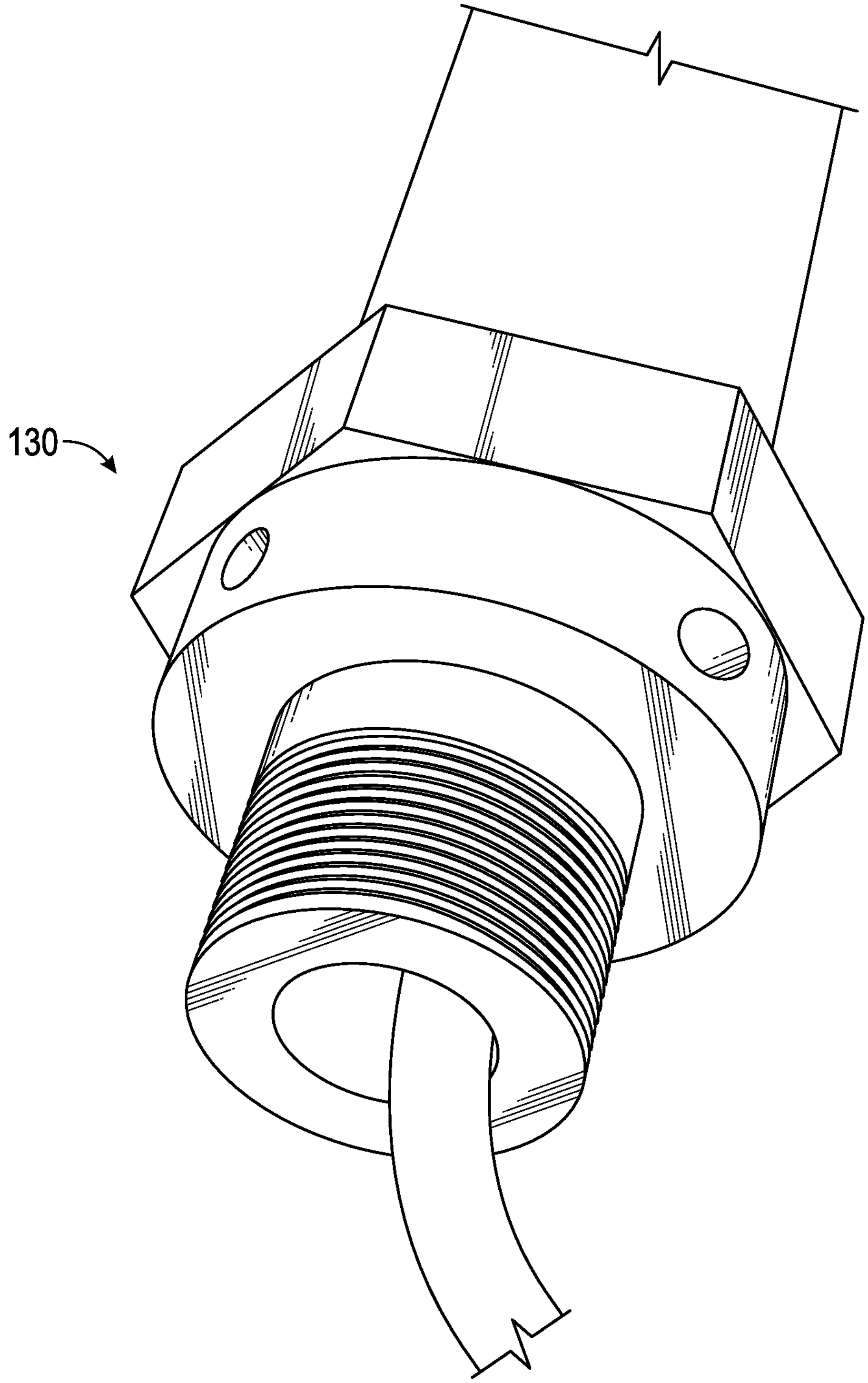
FIGS. 5A-5D illustrate a base in accordance with embodiments of the present disclosure.
Figure 5B:
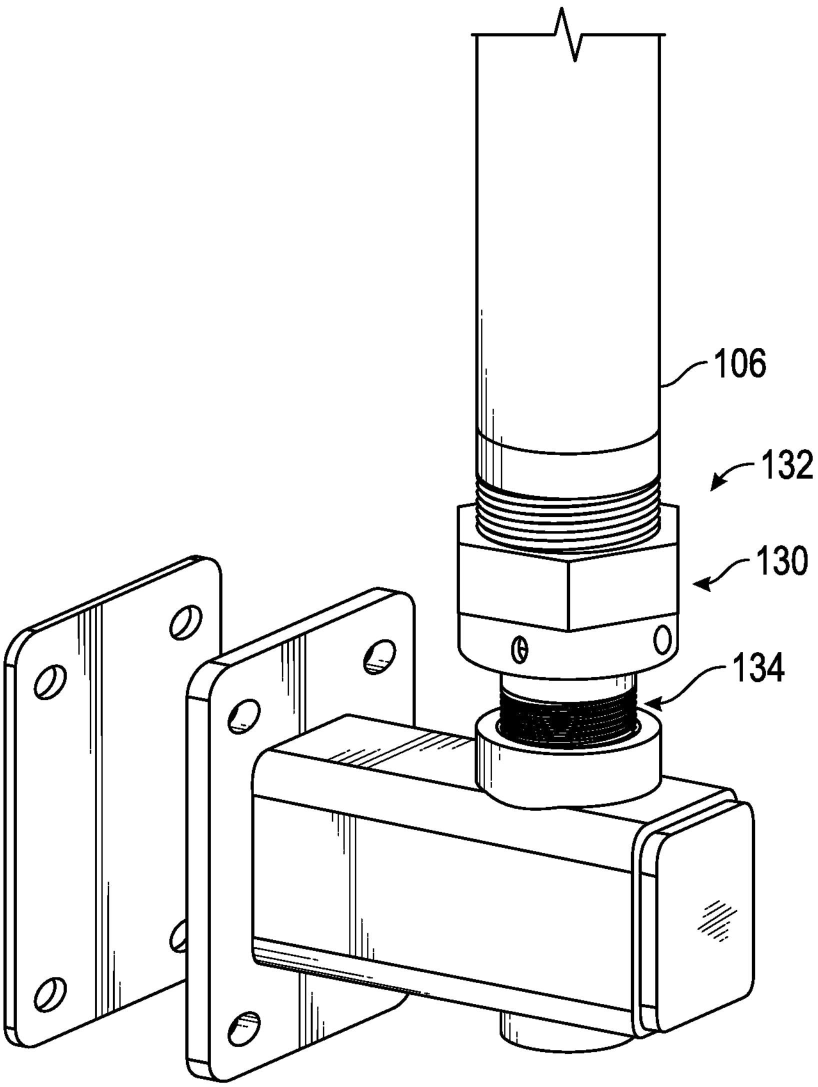
Figure 5C:
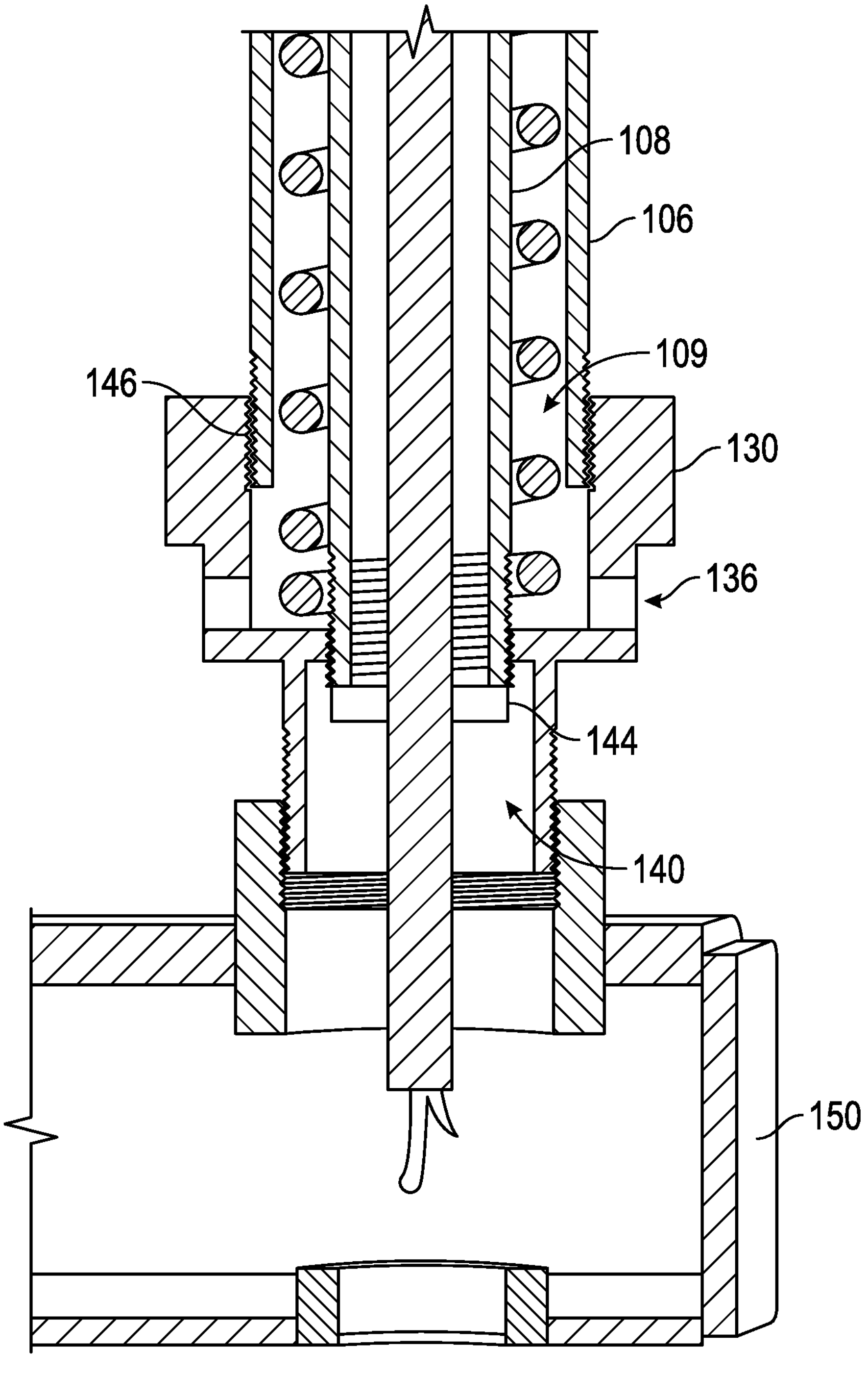
Figure 5D:
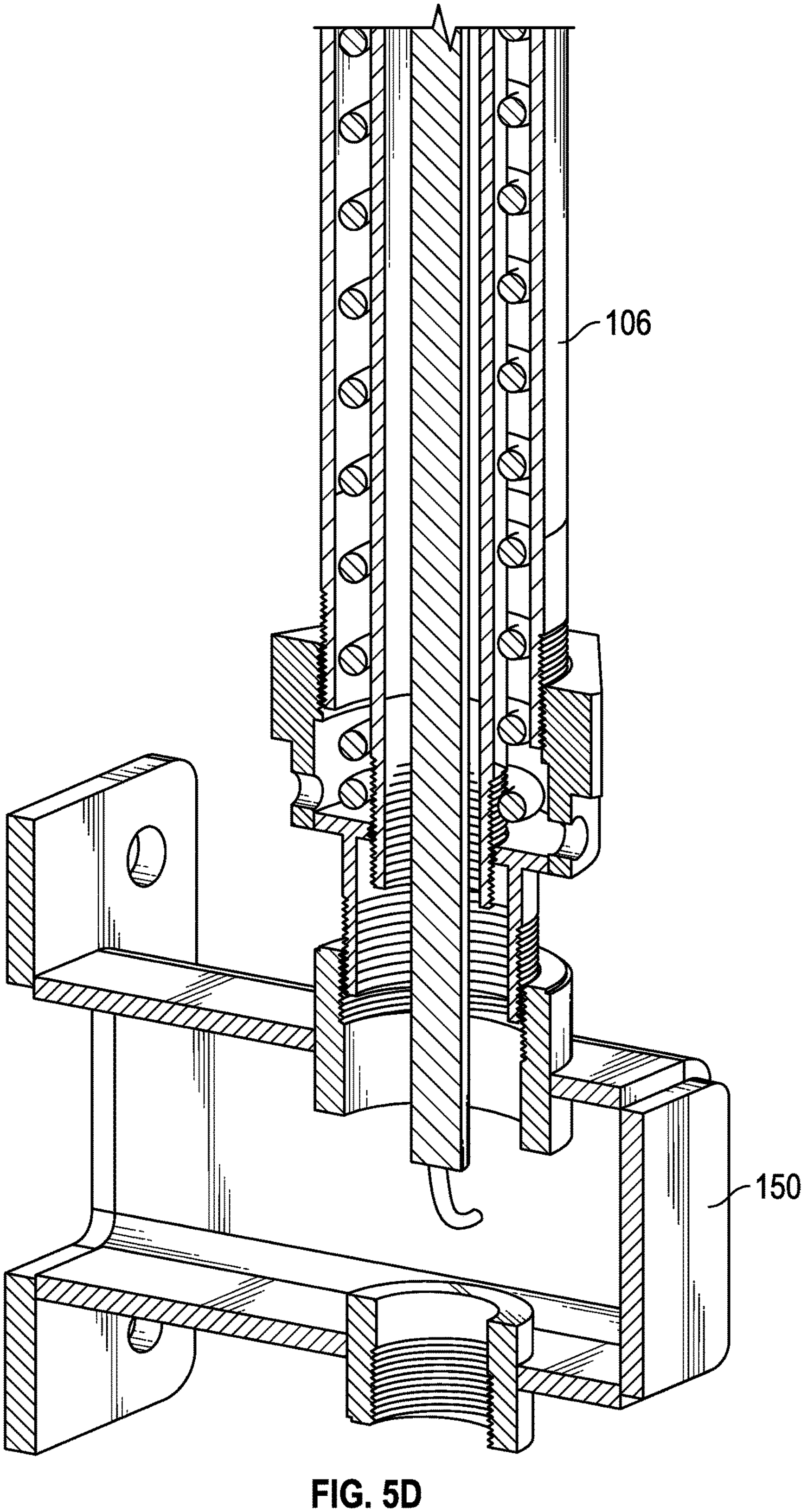

FIGS. 4A & 4B illustrate locking assemblies in accordance with embodiments of the present disclosure. Locking assembly 104 includes a body 114 having a passage 115 in which the upper support 102 (FIG. 3) slides therethrough. The passage 115 may be tailored to the upper support 102 to allow sliding translation of upper support 102 while discouraging ingress of moisture and particulates. The body 114 is attached to the lower support 106 to enclose the passage 115 at a first end while maintaining the passage 115 in fluid communication with the interior of the lower support 106. The body 114 may be attached to the lower support 106 by at least one selectably sealingly engageable fastener (e.g., via threaded connection or mechanical seal), by use of adhesives, epoxies, or resins, or using other fasteners.

Lock 116 is configured to selectably engage the upper support 102 to constrain axial motion of the upper support 102. The locking assembly 104 further includes a raised surface 124 in the passage. Lock 116 may be implemented using various fasteners or biasing mechanisms.

Referring to FIG. 4B, in example embodiments, the lock 116' may be a translational member 117 configured to translate into the passage 115 against the upper support 102 in response to tightening of threaded bolts 120 into corresponding threaded channels (not shown) in the body 114'. The locking assembly 104' further includes a raised surface 126 in the passage 115 opposite the translational member 117, implemented as a ledge (i.e., a flat surface against which the upper support 102 is held upon engaging the lock 116'. Other embodiments of lock 116, 116' may employ corresponding nuts or the like, use clasps or other fasteners, or operate using rotational versus translational motion. Any type of fastener may be used to engage the lock 116, 116'.

Referring to FIGS. 1 & 3, the electrical system is routed through the lower and upper supports and provides power to the attached light fixture 122. Embodiments of the present disclosure may also include wiring 112 interior to the upper and lower support members and the guide member. Guide member 108 may be implemented as fluid-tight electrical conduit or similar fluid-tight tubular. Additionally or alternatively to guide member 108, wiring chamber 160 may be interior to the lower support 106, as described below with reference to FIG. 6.

FIGS. 5A-5D illustrate a base in accordance with embodiments of the present disclosure. Base 130 includes a channel 140 between the first end of the base 132 and a second end of the base 134. Base 130 is configured for coupling with fluid-tight tubular (e.g., electrical conduit) and the lower support 106 at their corresponding ends opposite the locking assembly 104. Upon being coupled with the tubular and channel in fluid-tight communication with the fluid-tight electrical conduit. Threaded connections 144 and 146 enable sealing engagement with the conduit and the lower support 106, respectively. Upon connection, base 130 is configured to isolate the interior of the fluid-tight electrical conduit from the annular space 109 between the lower support 106 and the guide member 108. Threaded connection 142 at the second end 134 enables sealing engagement with interior of junction box 150. Weep holes 136 allow condensation or other moisture to drain from the annular space 109.

Figure 6:
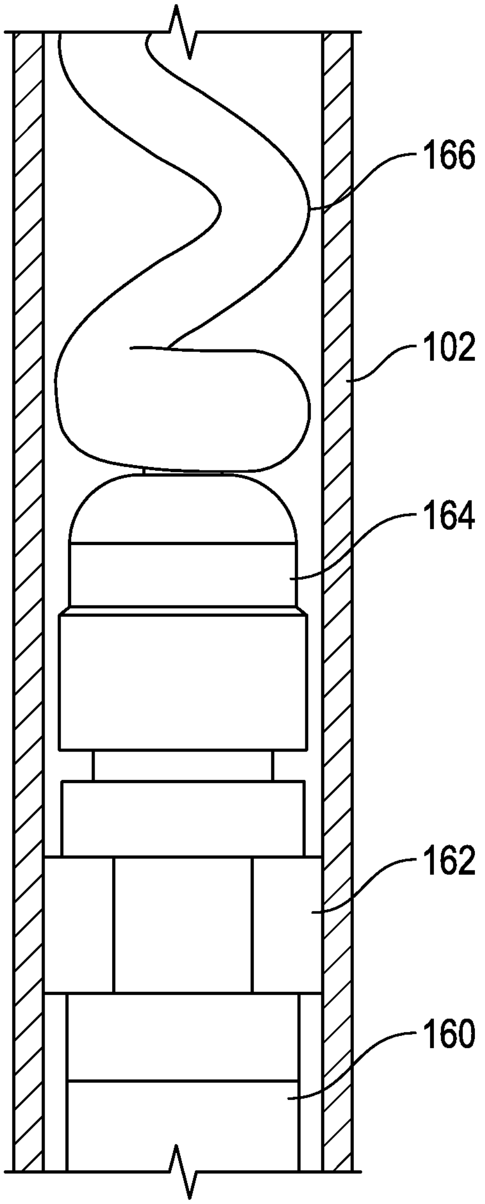
FIG. 6 illustrates a pole support system having a wiring chamber in accordance with embodiments of the present disclosure.
Figure 7A:
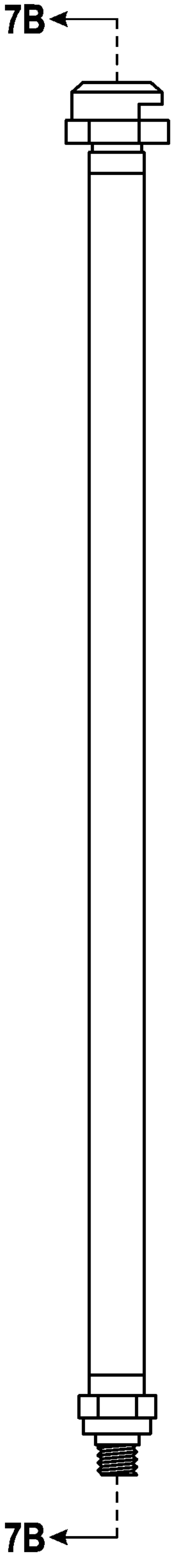
FIGS. 7A-7L illustrate embodiments configured for various modes of use in accordance with embodiments of the present disclosure.
Figure 7B:
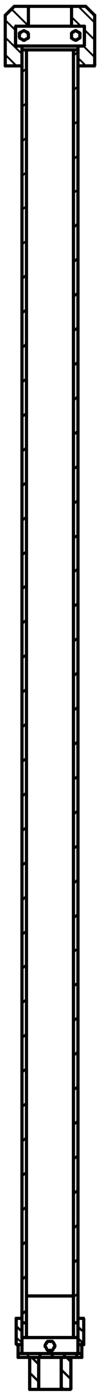
Figure 7C:
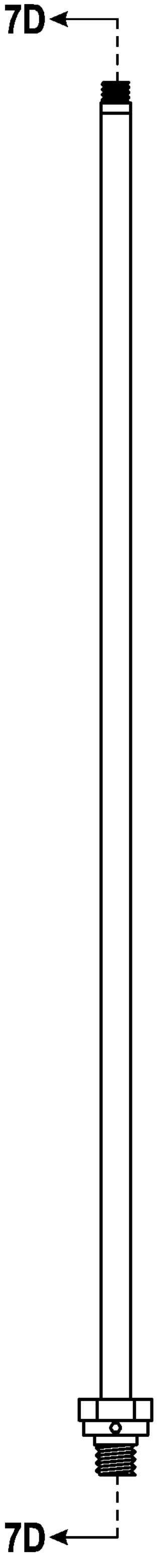
Figure 7D:
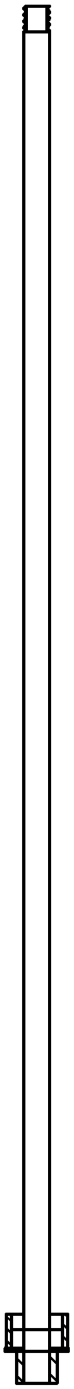
Figure 7E:
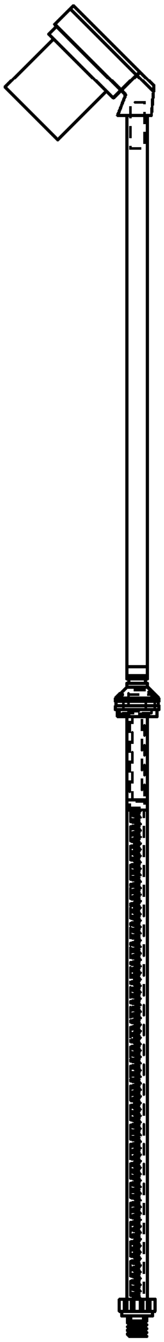
Figure 7F:
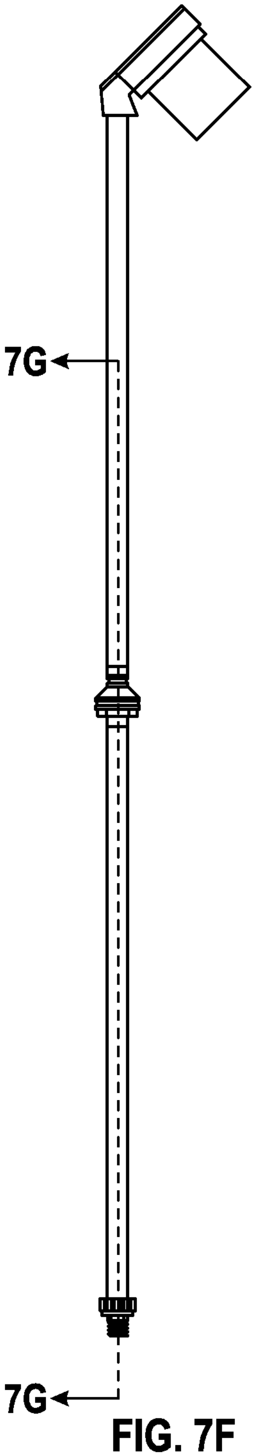
Figure 7G:
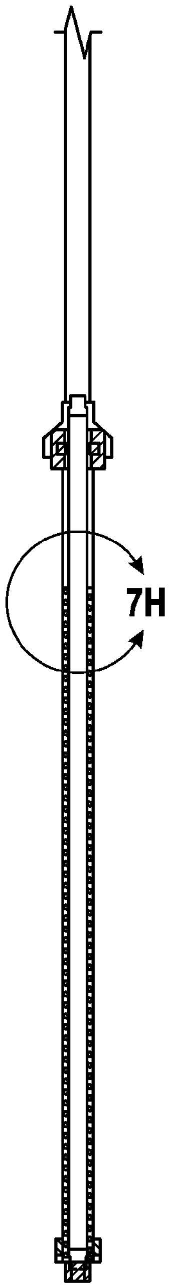
Figure 7H:
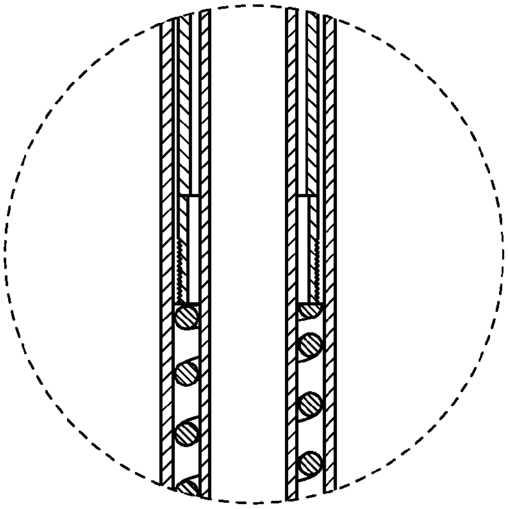
Figure 7I:
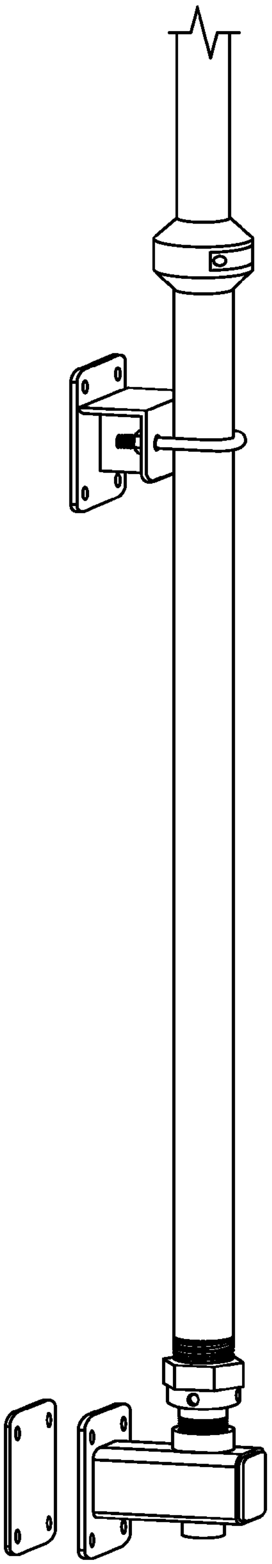
Figure 7J:
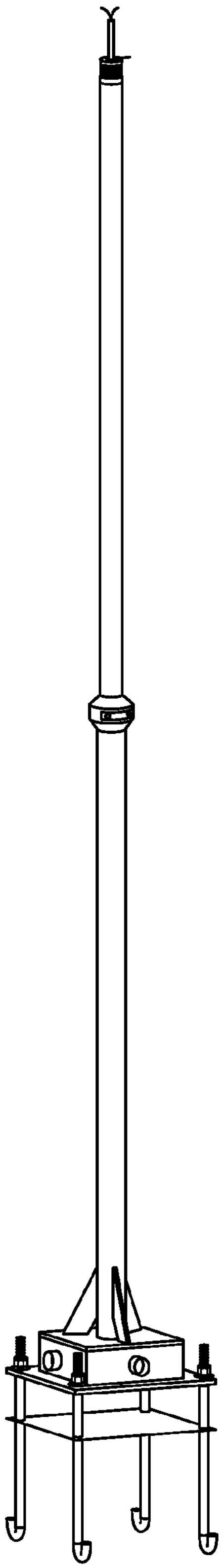
Figure 7K:
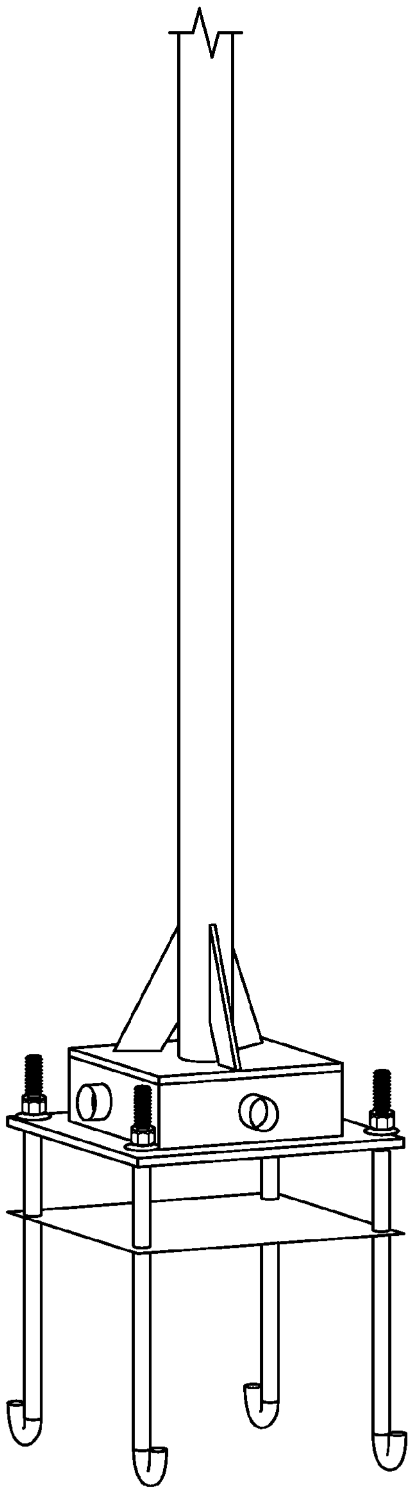
Figure 7L:
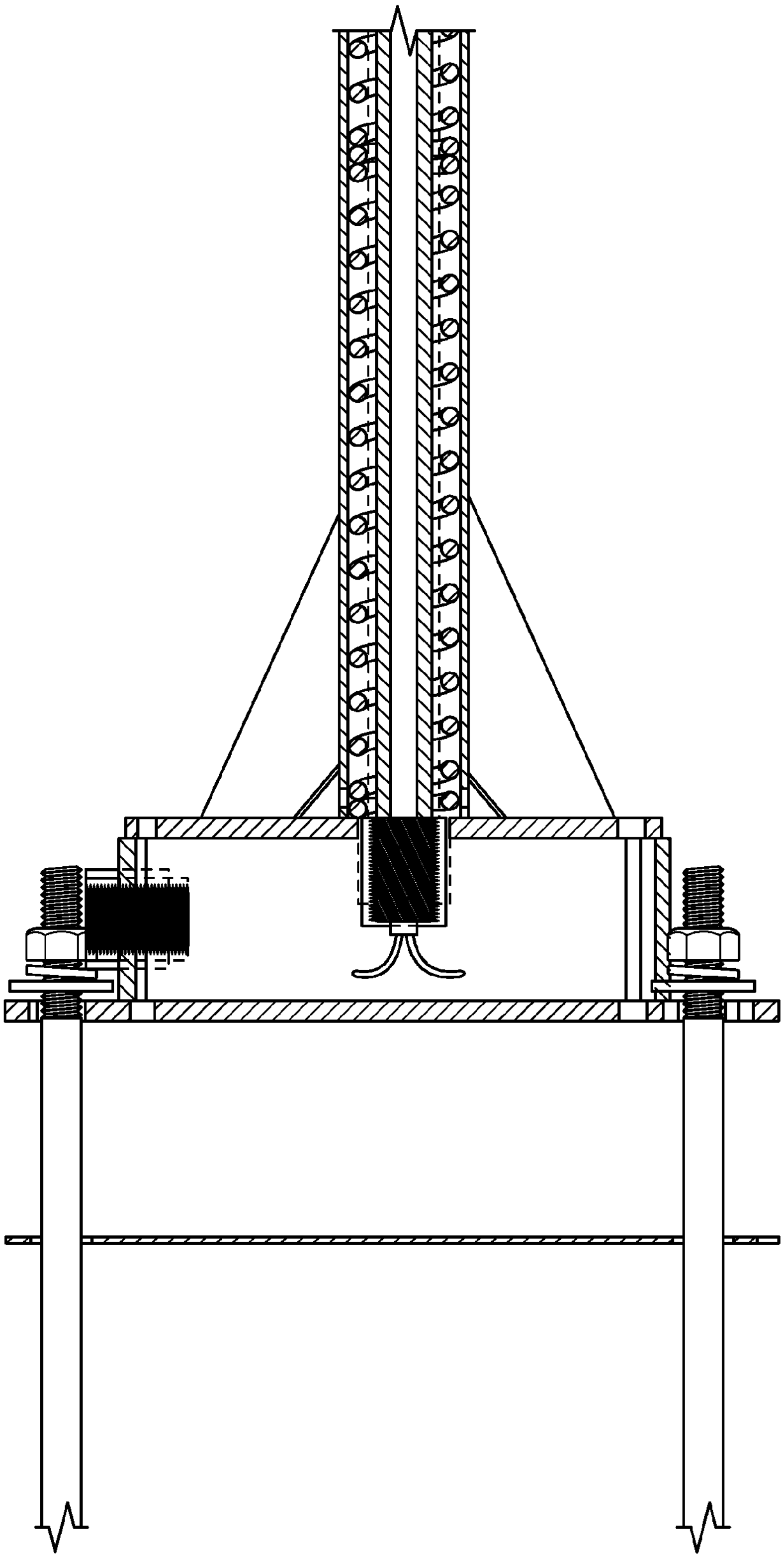

Referring to FIG. 6, wiring chamber 160 may comprise electrical conduit or the like, but may not be necessary for guiding biasing member 110 or upper support 102. Wiring chamber may include an adaptor 162. In some embodiments, the adaptor 162 and the wiring chamber 160 (or guide member 108) may be coupled through threaded engagement. Wiring seal 164 may be used to prevent ingress of moisture into wiring chamber 160 (or guide member 108). Wire 112 includes an elastically coiled portion 166, which is configured to conform to a length of a portion of the upper support above the locking mechanism. The elastically coiled portion 166 is configured such that, when the upper support 102 is lowered, the portion 166 will re-coil, thus preventing wiring 112 from bunching along the interior surface of the wiring chamber 160 (or guide member 108).

The light fixture 122 is connected to the upper support 102. The illumination source of the light fixture 122 is powered through a connection to the electrical system, comprising a power source and wiring 112. The power source can be externally supplied or provided in a base, which may act as a support for the first pole. The wire is protected within the supports. More specifically, the wire is housed in the guide member or wiring chamber of the lower support and the interior chamber of the upper support. This positioning separates the wire from the spring assist system (e.g., biasing member 110). The provision of a separate housing for the wiring 112 is prevents the wire from interacting with or becoming damaged by the spring assist. In addition, the sealed conduit of the guide member or wiring chamber protects the wire from moisture, which can also be problematic.

FIGS. 7A-7L illustrate various modes of use including wall mounting and spring mounting. As will be apparent, various means of mounting the pole support system described above will occur to those of skill in the art.

The discussion above has focused primarily on embodiments of the disclosure for use with industrial light poles. Other embodiments may be used with other types of elongate objects, or in other environments. It should be understood that the inventive concepts disclosed herein are capable of many modifications. To the extent such modifications fall within the scope of the appended claims and their equivalents, they are intended to be covered by this patent.

What is claimed is:

1. A pole support system comprising:

a tubular lower support;

a guide member interior to the lower support;

a telescoping upper support inside the lower support and axially movable between an extended position and a retracted position, the upper support being at least partially received in an annular space between the lower support and the guide member; and a base, wherein the lower support is securely attached to the base at a first axial position and the guide member is securely attached to the base at a second axial position, and the guide member extends beyond the lower support only in the base.

2. The apparatus of claim 1, wherein the guide member is a fluid-tight and tubular wiring chamber having an electrical wire passing therethrough.

3. The apparatus of claim 1, wherein the base is configured to isolate an interior of the guide member from the annular space between the lower support and the guide member.

4. The apparatus of claim 3, wherein the base comprises a channel between the first end of the base and a second end of the base, the channel in fluid-tight communication with the interior of the guide member.

5. The apparatus of claim 1, further comprising electrical wiring, wherein a portion of the electrical wiring within the upper support is configured to conform to a length of a portion of the upper support above the locking mechanism.

6. The apparatus of claim 5, further comprising a wiring seal.

7. The apparatus of claim 1, wherein the guide member is coaxial with a longitudinal axis of the lower support.

8. The apparatus of claim 1, further comprising a locking assembly partially surrounding the lower support at one end of the lower support, the locking assembly configured to lock an axial position of the upper support between the extended position and the retracted position.

9. The apparatus of claim 8, wherein the locking assembly comprises:

a body having a passage in which the upper support slides therethrough, the body attached to the lower support to enclose the passage at a first end while maintaining the passage in fluid communication with the interior of the lower support; and a lock configured to selectively engage the upper support to constrain axial motion of the upper support.

10. The apparatus of claim 1, further comprising a biasing member that biases the upper support toward the extended position.

11. The apparatus of claim 10, wherein the biasing member comprises a spring in the annular space between the lower support and the guide member.

12. The apparatus of claim 9, wherein the body is attached to the lower support by at least one sealable fastener.

13. The apparatus of claim 9, wherein the lock comprises a translational member configured to translate into the passage against the upper support.

14. The apparatus of claim 13, wherein the locking assembly further comprises a raised surface in the passage opposite the translational member.

15. The apparatus of claim 14, wherein the raised surface is a ledge.

16. The apparatus of claim 1, wherein the base comprises weep holes for allowing condensation and other moisture to drain from the annular space.

17. The apparatus of claim 1, wherein the base is securely attached to a junction box such that an interior of the junction box is in fluid-tight communication with an interior of the guide member.

18. The apparatus of claim 1, wherein the lower support is securely attached at a top of the base and the guide member is securely attached in a middle or bottom of the base.

* * * * *